(No Model.)

R. B. LANGILL.
TIRE SHRINKER.

No. 403,115. Patented May 14, 1889.

Witnesses:
K. Durfee,
H. M. Feegan

Inventor:
Ross B. Langill
per C. A. Shawtles,
Attys.

UNITED STATES PATENT OFFICE.

ROSS B. LANGILL, OF RIVER JOHN, NOVA SCOTIA, CANADA.

TIRE-SHRINKER.

SPECIFICATION forming part of Letters Patent No. 403,115, dated May 14, 1889.

Application filed January 25, 1889. Serial No. 297,542. (No model.)

*To all whom it may concern:*

Be it known that I, ROSS B. LANGILL, of River John, county of Pictou, Province of Nova Scotia, Dominion of Canada, have invented a certain new and useful Improvement in Tire-Shrinkers, of which the following is a description sufficiently full, clear, and exact to enable any person skilled in the art or science to which said invention appertains to make and use the same, reference being had to the accompanying drawings, forming part of this specification, in which—

Figure 1:
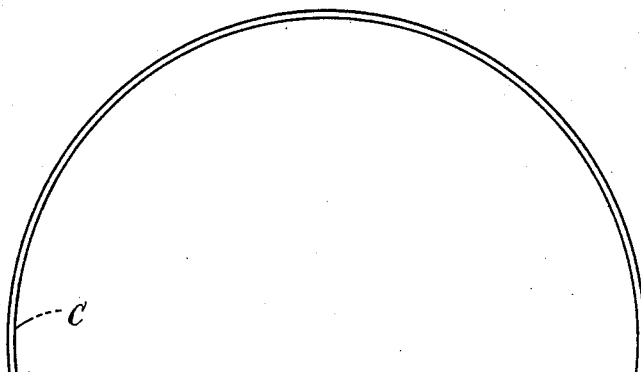
Figure 2:
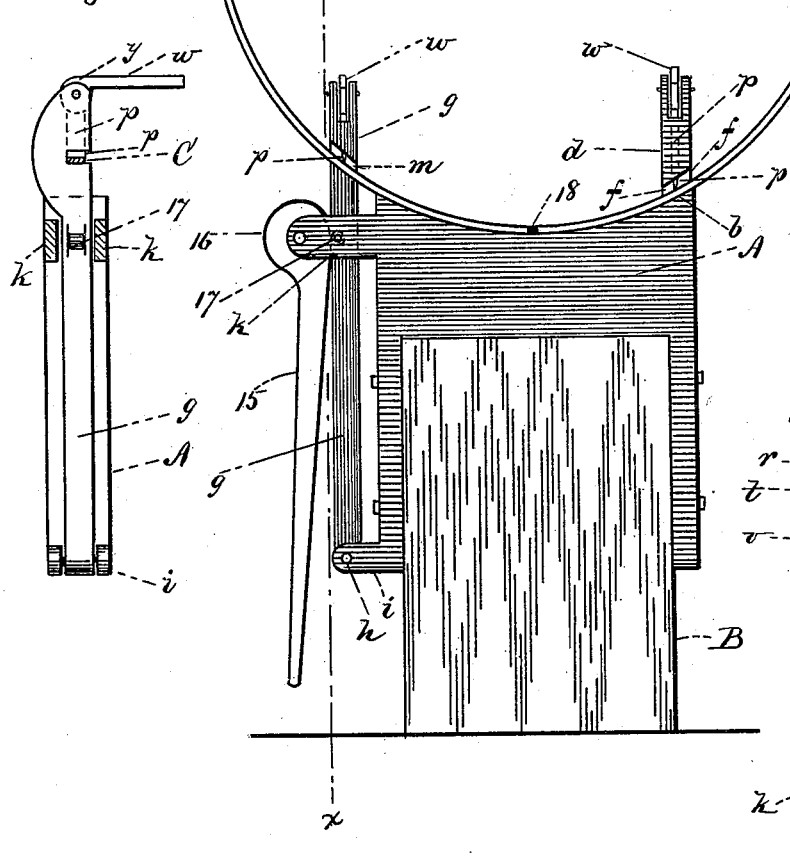
Figure 3:
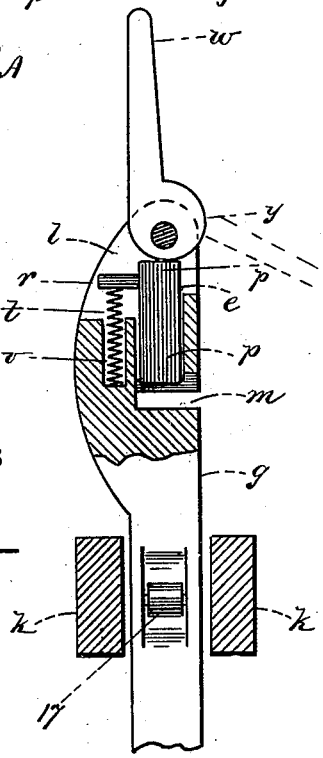

Figure 1 is a front elevation of my improved tire-shrinker represented as in use; Fig. 2, a vertical transverse section taken on line $x$ $x$ in Fig. 1; Fig. 3, an enlarged sectional view illustrating certain details of construct.

Like letters and figures of reference indicate corresponding parts in the different figures of the drawings.

My invention relates especially to a device for shortening or shrinking metallic wheel-tires; and it consists in certain novel features, as hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body proper of the shrinker; B, the supporting-block, and C the tire. The body proper, A, is constructed of iron, and is bolted to the supporting-block B. The upper edge of the body is grooved or curved longitudinally at $b$ on an arc of a circle approximating that of the tire.

At one end of the curved face $b$ of the body is secured a vertical standard, $d$, said standard being slotted diagonally at $f$ to enable the tire to be inserted on said face. A bar, $g$, is pivoted by its lower end at $h$ in lugs $i$ on said body, said bar being arranged vertically and working laterally between ears $k$ on the upper portion of said body. The bar $g$ is provided with a diagonal slot, $m$, in the same circle and corresponding with the slot $f$ in the standard $d$. The upper end of the bar $g$ and standard $d$ above the slots $f$ $m$ are chambered vertically at $l$, said chambers opening into said slots.

Fitted to slide in each chamber $l$ there is a retaining-plate, $p$, which projects into the slots $f$ $m$ to engage the tire when inserted therein. A rod, $r$, projects rearwardly from the upper portion of each plate $p$, and a coiled spring, $t$, is disposed in a chamber, $v$, at the rear of the chamber $l$, said spring being secured to the rod $r$ and acting expansively to elevate the plate $p$, so that it will not project into the slot $m$.

In the top of the bar $g$ and standard $d$ there is pivoted a lever, $w$, having a cam-head, $y$, in engagement with the upper end of the plate $p$ and adapted to force said plate downward when said lever is depressed. A lever, 15, is pivoted in the ears $k$, and is provided with a cam-head, 16, which engages a roll, 17, in the bar $g$ and forces said bar inward toward the body A when said lever is elevated.

In the use of my improvement the body A serves the purpose of an anvil. The tire, C, to be shrunken is heated at a point, 18, and inserted in the slots $f$ $m$ of the standard $d$ and bar $g$, so that its heated portion rests on the curved face $b$ of the body. The levers $w$ are then depressed, forcing the plates $p$ downward into engagement with the tire and securely clamping it in said slots. The lower edges of the plates are preferably sharpened, to prevent the tire from slipping under them. By elevating the lever 15 the bar $g$ is forced inward toward the body, causing the heated portion of the tire to expand laterally and bringing the points secured in the clamps nearer each other, thus shortening the circumference of the tire in a manner that will be readily understood without a more explicit description.

Having thus explained my invention, what I claim is—

1. The combination of a solid body provided with a curved upper face adapted to serve as an anvil, standards secured at one end of said body and provided with a curved slot, a vertical bar pivoted at the opposite end of said body, and also provided with a curved slot, clamping-plates projecting into said slots, cam-levers for forcing said plates into engagement with the tire, and a cam-lever pivoted to said body for forcing the pivoted bar toward said standard, substantially as described.

2. In a tire-shrinker, the combination of the body A, provided with the curved face $b$, the standard $d$, secured thereto and having the slot $f$, the bars $g$, pivoted to said body and provided with the slot $m$, the cam-lever 15, for actuating said bar, the clamping-plates $p$ in said bar and standard, the springs $t$ and rods $r$, for elevating said plates, and the cam-levers $w$, for depressing said plates, all being arranged to operate substantially as described.

ROSS B. LANGILL.

Witnesses:
IRA E. DOYEN,
I. A. STEWART.